US012455585B2

(12) United States Patent
Chang et al.

(10) Patent No.: US 12,455,585 B2
(45) Date of Patent: Oct. 28, 2025

(54) LOW-POWER REFERENCE CURRENT AND VOLTAGE SOURCE CIRCUITS INSENSITIVE TO TEMPERATURE AND VOLTAGE VARIATIONS

(71) Applicants: Kang-Shuo Chang, New Taipei (TW); Kaoru Takasuka, New Taipei (TW)

(72) Inventors: Kang-Shuo Chang, New Taipei (TW); Kaoru Takasuka, New Taipei (TW)

(73) Assignee: iSentek Inc., New Taipei (TW)

( * ) Notice: Subject to any disclaimer, the term of this patent is extended or adjusted under 35 U.S.C. 154(b) by 274 days.

(21) Appl. No.: 18/361,932

(22) Filed: Jul. 31, 2023

(65) Prior Publication Data

US 2025/0013256 A1 Jan. 9, 2025

(30) Foreign Application Priority Data

Jul. 4, 2023 (TW) ................................ 112124894

(51) Int. Cl.
*G05F 3/16* (2006.01)
*G05F 1/46* (2006.01)

(52) U.S. Cl.
CPC ................ *G05F 3/16* (2013.01); *G05F 1/468* (2013.01)

(58) Field of Classification Search
CPC ... G05F 3/16; G05F 1/468; G05F 3/30; G05F 1/561
See application file for complete search history.

(56) References Cited

U.S. PATENT DOCUMENTS 6,005,378 A * 12/1999 D'Angelo .............. G11C 5/147 323/273
8,072,329 B1 * 12/2011 Srinivas ........... G06K 19/07749 455/343.1
9,519,304 B1 * 12/2016 Far ............................ G05F 3/08
2009/0058384 A1 3/2009 Taniguchi
2013/0106504 A1 * 5/2013 Lin ......................... G05F 3/247 327/566
2022/0171419 A1 * 6/2022 Liao ........................ G05F 3/262

FOREIGN PATENT DOCUMENTS

CN 101237226 8/2008
TW 202135465 9/2021

OTHER PUBLICATIONS

"Office Action of Taiwan Counterpart Application", issued on May 15, 2024, p. 1-p. 8.

* cited by examiner

*Primary Examiner* — Monica Lewis
*Assistant Examiner* — Lakaisha Jackson
(74) *Attorney, Agent, or Firm* — JCIPRNET

(57) ABSTRACT

A reference current generating circuit including a reference voltage generating circuit and a current source circuit is provided. The reference voltage generating circuit generates a first reference voltage according to a first current. The reference voltage generating circuit includes a native transistor device, and the first current flows through the native transistor device. The current source circuit is coupled to the reference voltage generating circuit. The current source circuit generates a reference current according to the first reference voltage. The current source circuit includes a cascode transistor circuit, and the reference current flows through the cascode transistor circuit. The cascode transistor circuit includes a low-voltage transistor device and a high-voltage transistor device coupled in series.

9 Claims, 2 Drawing Sheets

LOW-POWER REFERENCE CURRENT AND VOLTAGE SOURCE CIRCUITS INSENSITIVE TO TEMPERATURE AND VOLTAGE VARIATIONS

CROSS-REFERENCE TO RELATED APPLICATION

This application claims the priority benefit of Taiwan application serial no. 112124894, filed on Jul. 4, 2023. The entirety of the above-mentioned patent application is hereby incorporated by reference herein and made a part of this specification.

BACKGROUND

Technical Field

The disclosure relates to a reference current generating circuit, and particularly relates to a reference current generating circuit applied to an oscillator circuit.

Description of Related Art

The processor circuit of the magnetoresistive sensor usually needs to configure an oscillator circuit to perform the counting function. For example, when the ultra-slow oscillator used for counting operates at a frequency of 1 Hz, the circuit is only activated once per second and enters a sleep mode at other times. Under such an application scenario, the accuracy of the counting function of the oscillator circuit is quite important. If the oscillation signal generated by the oscillator circuit changes with the temperature and voltage easily, then the accuracy of the counting is reduced.

SUMMARY

The disclosure provides a reference current generating circuit, a reference current and a reference voltage generated by the reference current generating circuit does not change with the temperature easily, so the accuracy of the oscillator circuit can be improved when applied to the oscillator circuit.

The reference current generating circuit of the disclosure includes a reference voltage generating circuit and a current source circuit. The reference voltage generating circuit is configured to generate a first reference voltage according to a first current. The reference voltage generating circuit includes a native transistor device, and the first current flows through the native transistor device. The current source circuit is coupled to the reference voltage generating circuit. The current source circuit is configured to generate a reference current according to the first reference voltage. The current source circuit includes a cascode transistor circuit and the reference current flows through the cascode transistor circuit. The cascode transistor circuit includes a low-voltage transistor device and a high-voltage transistor device coupled in series.

In order to make the above-mentioned features and advantages of the disclosure more comprehensible, the following specific embodiments are described in detail together with the accompanying drawings.

DESCRIPTION OF THE EMBODIMENTS

Figure 1:
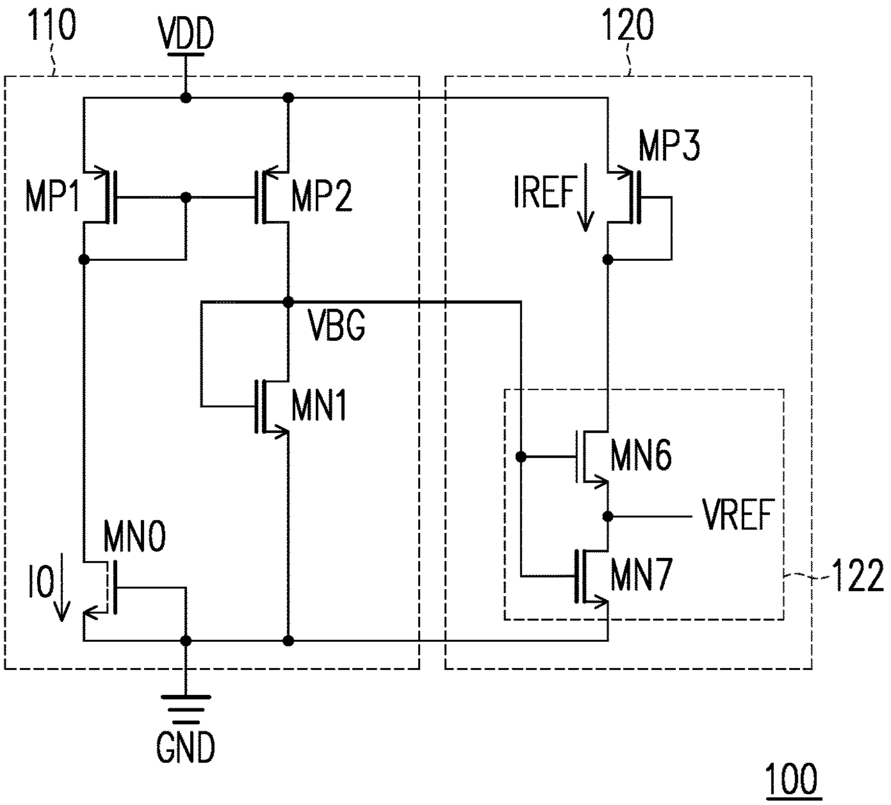
FIG. 1 shows a schematic structural diagram of a reference current generating circuit according to an embodiment of disclosure.

FIG. 1 shows a schematic structural diagram of a reference current generating circuit according to an embodiment of disclosure. Please refer to FIG. 1. A reference current generating circuit 100 of this embodiment includes a reference voltage generating circuit 110 and a current source circuit 120. The reference voltage generating circuit 110 is configured to generate a first reference voltage VBG (that is, a reference voltage) according to a first current I0. The reference voltage generating circuit 110 includes a native transistor device MN0. The first current I0 flows through the native transistor device MN0. The native transistor device is a transistor device whose threshold voltage is close to 0 voltage (V).

The current source circuit 120 is coupled to the reference voltage generating circuit 110. The current source circuit 120 is configured to generate a reference current IREF according to the first reference voltage VBG. The current source circuit 120 includes a cascode transistor circuit 122. The reference current flows through the cascode transistor circuit 122. The cascode transistor circuit 122 includes a low-voltage transistor device MN6 and a high-voltage transistor device MN7 coupled in series. The low-voltage transistor device is a transistor device having a low threshold voltage and a low withstand voltage, for example, Vt=0.4V, and a maximum VDD is 1.8V. The high-voltage transistor device is a transistor device having a high threshold voltage and a high withstand voltage, for example, Vt=0.7V, and the maximum VDD is 3.3V.

Specifically, the current source circuit 120 further includes a first transistor device MP3. The first transistor device MP3 has a first terminal, a second terminal, and a control terminal. The first terminal of the first transistor device MP3 is coupled to the first voltage VDD (system high voltage), the second terminal of the first transistor device is coupled to the cascode transistor circuit 122, and the control terminal of the first transistor device MP3 is coupled to the second terminal of the first transistor device MP.

The low-voltage transistor device MN6 has a first terminal, a second terminal, and a control terminal. The first terminal of the low-voltage transistor device MN6 is coupled to the second terminal of the first transistor device MP3, and the control terminal of the low-voltage transistor device MN6 is coupled to the reference voltage generating circuit 110.

The high-voltage transistor device MN7 has a first terminal, a second terminal, and a control terminal. The first terminal of the high-voltage transistor device MN7 is coupled to the second terminal of the low-voltage transistor device MN6, the second terminal of the high-voltage transistor device MN7 is coupled to a second voltage GND (system low voltage), and the control terminal of the high-voltage transistor device MN7 is coupled to the reference voltage generating circuit 110. The high-voltage transistor device MN7 operates in a subthreshold region.

The control terminal of the low-voltage transistor device MN6 and the control terminal of the high-voltage transistor device MN7 receive the first reference voltage VBG and are controlled by the first reference voltage VBG. The reference current IREF flows through the first transistor device MP3, the low-voltage transistor device MN6, and the high-voltage transistor device MN7 sequentially to generate a second reference voltage VREF at the first terminal of the high-voltage transistor device MN7.

Figure 2:
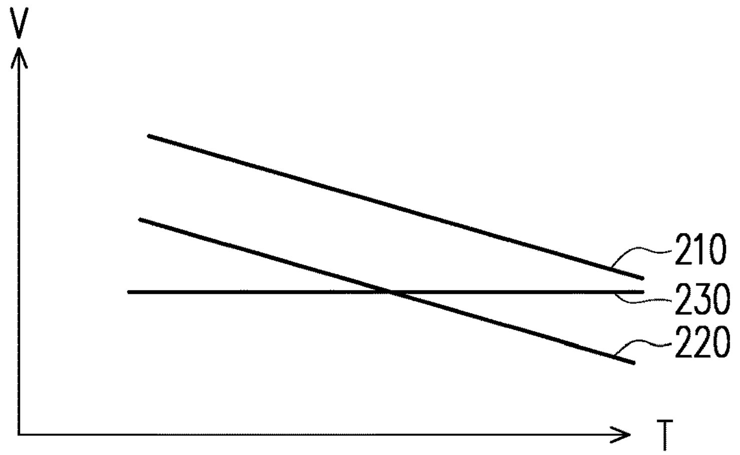
FIG. 2 is a schematic diagram showing a threshold voltage changing with the temperature with respect to a low-voltage transistor device and a high-voltage transistor device according to an embodiment of the disclosure.

In this embodiment, the second reference voltage VREF is less affected by the change of the temperature, which is described as follows. FIG. 2 is a schematic diagram showing a threshold voltage changing with the temperature with respect to the low-voltage transistor device and the high-voltage transistor device according to an embodiment of the disclosure. A line 210 shows that a threshold voltage Vth7 of the high-voltage transistor device MN7 decreases as the temperature changes, and a line 220 shows that a threshold voltage Vth6 of the low-voltage transistor device MN6 decreases as the temperature changes, in which the vertical axis is voltage, the unit is V; the horizontal axis is the absolute temperature, the unit is K.

The second reference voltage VREF may be expressed as the following formula:

$$VREF = (Vth7 - Vth6) + VT \times \ln(S6/S7)$$

VREF is the second reference voltage; Vth6 and Vth7 are the threshold voltages of the low-voltage transistor device MN6 and the high-voltage transistor device MN7 respectively; S6 and S7 are parameters S of the low-voltage transistor device MN6 and the high-voltage transistor device MN7 respectively, in which S=(W/L)Cox, L is the channel length of the transistor, W is the channel width of the transistor, Cox is the gate oxide layer capacitance of the transistor; VT is the thermal voltage, approximately 0.026 V; and ln(S6/S7) is the natural logarithm of S6 divided by S7.

It may be seen from FIG. 2 that since the difference between the threshold voltages Vth6 and Vth7 of the low-voltage transistor device MN6 and the high-voltage transistor device MN7 Vth7−Vth6 (that is, a line 230) is fixed and does not change with the temperature, the second reference voltage VVREF is less affected by the change of the temperature.

In this embodiment, the high-voltage transistor device MN7 operates in the subthreshold or weak-inversion region, and a drain current $I_D$ may be expressed as:

$$I_D = S\mu V_T^2 \exp\left(\frac{V_{GS} - V_{th}}{\mathrm{m}V_T}\right)$$

$I_D$ is the drain current of the transistor; the parameter of the transistor S=(W/L)Cox, in which L is the channel length of the transistor, W is the channel width of the transistor, Cox is the gate oxide layer capacitance of the transistor; μ is the carrier mobility; exp( ) is an exponential function with the natural constant e as the base; VT is thermal voltage, approximately 0.026 V; $V_{GS}$ is the voltage difference between the gate and the source of the transistor; Vth is the threshold voltage of the transistor; and m is the subthreshold slope parameter.

Since the reference current IREF flows through the first transistor device MP3, the low-voltage transistor device MN6, and the high-voltage transistor device MN7 sequentially, the reference current IREF is substantially equal to the drain current $I_D$ of the high-voltage transistor device MN7. Therefore, the amount of the reference current IREF is also determined by the above current formula.

In the above current formula, when the temperature T increases, the carrier mobility μ decreases, the voltage difference $V_{GS}$ between the gate and the source of the transistor decreases, the threshold voltage Vth decreases, the subthreshold slope parameter m increases, the thermal voltage VT increases, and the overall value of the exponential function exp( ) decreases. Therefore, in this embodiment, by appropriately designing the size (i.e., the transistor parameter S) of the high-voltage transistor device MN7, the reference current IREF is less affected by the change of the temperature within a certain temperature range.

On the other hand, please refer to FIG. 1 again. The reference voltage generating circuit 110 further includes a second transistor device MP1, a third transistor device MP2, and a fourth transistor device MN1. The second transistor device MP1 has a first terminal, a second terminal, and a control terminal. The first terminal of the second transistor device MP1 is coupled to the first voltage VDD, and the second terminal of the second transistor device MP1 is coupled to the control terminal of the second transistor device MP1.

The third transistor device MP2 has a first terminal, a second terminal, and a control terminal. The first terminal of the third transistor device MP2 is coupled to the first voltage VDD, and the control terminal of the third transistor device MP2 is coupled to the control terminal of the second transistor device MP1.

The fourth transistor device MN1 has a first terminal, a second terminal, and a control terminal. The first terminal of the fourth transistor device MN1 is coupled to the second terminal of the third transistor device MP2, the second terminal of the fourth transistor device MN1 is coupled to the second voltage GND, and the control terminal of the fourth transistor device MN1 is coupled to the first terminal of the fourth transistor device MN1. The first terminal of the fourth transistor device MN1 is coupled to the current source circuit 120, and the first reference voltage VBG is generated at the first terminal of the fourth transistor device MN1 and is output to the current source circuit 120 through the first terminal of the fourth transistor device MN1.

The native transistor device MN0 has a first terminal, a second terminal, and a control terminal. The first terminal of the native transistor device MN0 is coupled to the second terminal of the second transistor device MP1, and the second terminal and the control terminal of the native transistor device MN0 are coupled to the second voltage GND. The native transistor device MN0 operates in a saturation region.

In this embodiment, since the native transistor device MN0 operates in the saturation region, the first current I0 may be expressed as:

$$I0 = S \times \left(\frac{W}{L}\right) \times (V_{GS} - V_{th})^2$$

I0 is the drain current of the transistor; the parameter of the transistor S=½μCox, in which μ is the carrier mobility, Cox is the gate oxide capacitance of the transistor; L is the channel length of the transistor, W is the channel width of the transistor; $V_{GS}$ is the voltage difference between the gate and the source of the transistor; and Vth is the threshold voltage of the transistor, approximately −0.1V. In addition, since the $V_{GS}$ of the native transistor device MN0 is 0, the above current formula may be simplified as:

$$I0 = S \times \left(\frac{W}{L}\right) \times (V_{th})^2$$

It may be known from the above current formula that the first current I0 is the current irrelevant to the first voltage VDD, and does not change with the first voltage VDD easily. Since the first current I0 does not change with the first voltage VDD easily, the reference voltage generating circuit 110 can also generate the accurate first reference voltage VBG (i.e., the reference voltage).

In addition, in the embodiment of FIG. 1, other than that the native transistor device MN0 operates in the saturation region, other transistor devices operate in the subthreshold region.

Figure 3:
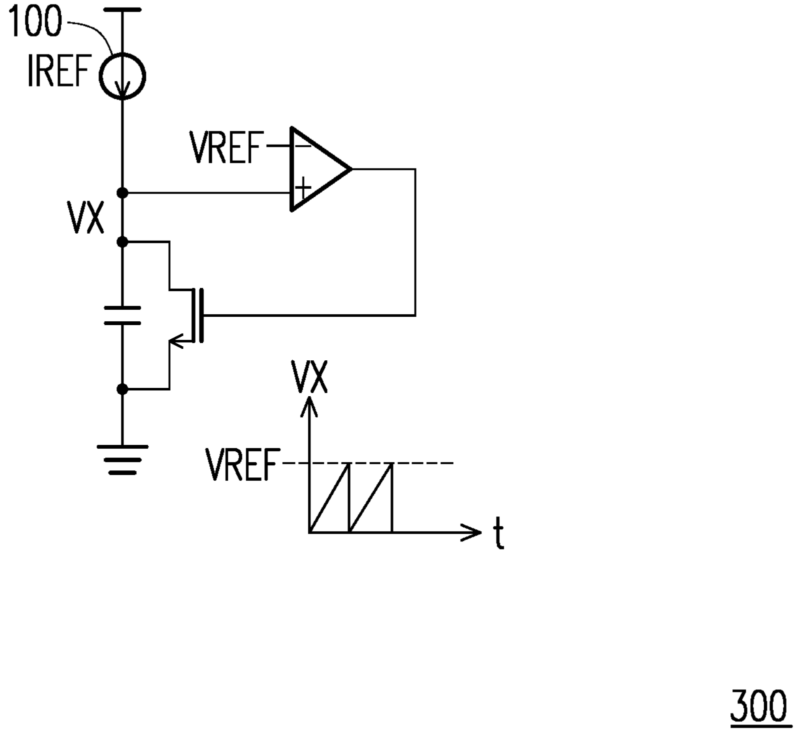
FIG. 3 shows a schematic diagram of an oscillator circuit according to an embodiment of the disclosure.

FIG. 3 shows a schematic diagram of an oscillator circuit according to an embodiment of the disclosure. Please refer to FIG. 1 and FIG. 3. The reference current IREF of the reference current generating circuit 100 of the embodiment of FIG. 1 may be applied to an oscillator circuit 300 in FIG. 3, configured to provide the reference current IREF to the oscillator circuit 300, and the second reference voltage VREF generated by the reference current generating circuit 100 may also be used as a reference voltage of the oscillator circuit 300. The oscillator circuit 300 generates an oscillation signal VX according to the reference current IREF and the reference voltage VREF, and a waveform is a sawtooth wave (triangular wave) that changes with time t. Since the reference current IREF is less affected by the change of the temperature, the oscillation signal VX is also less affected by the change of the temperature.

In addition, the oscillator circuit 300 shown in FIG. 3 may be applied to processor circuits of various magnetoresistive sensors such as, for example, a tunnel magnetoresistance (TMR) sensor, a giant magnetoresistance (GMR) sensor, or an anisotropic magnetoresistance (AMR) sensor to be used as a low-speed oscillator.

In summary, according to the embodiments of the disclosure, the reference voltage generating circuit can generate the accurate reference voltage, and through properly designing the size of the high-voltage transistor device of the current source circuit, the reference current can be less affected by the change of the temperature within a certain temperature range. In addition, the reference current and the reference voltage generated by the reference current generating circuit do not change with the temperature easily, so the accuracy of the oscillator circuit can be improved when applied to the oscillator circuit.

Although the disclosure has been disclosed above with the embodiments, the embodiments are not intended to limit the disclosure. Persons with ordinary knowledge in the technical field may make some changes and modifications without departing from the spirit and scope of the disclosure. Therefore, the scope of protection of the disclosure shall be defined by the appended claims.

What is claimed is:

1. A reference current generating circuit, comprising:

a reference voltage generating circuit configured to generate a first reference voltage according to a first current, wherein the reference voltage generating circuit comprises a native transistor device, and the first current flows through the native transistor device; and a current source circuit coupled to the reference voltage generating circuit and configured to generate a reference current according to the first reference voltage, wherein the current source circuit comprises a cascode transistor circuit, and the reference current flows through the cascode transistor circuit, wherein the cascode transistor circuit comprises a low-voltage transistor device and a high-voltage transistor device coupled in series, wherein the current source circuit further comprises: a first transistor device having a first terminal, a second terminal, and a control terminal, wherein the first terminal of the first transistor device is coupled to a first voltage, the second terminal of the first transistor device is coupled to the cascode transistor circuit, and the control terminal of the first transistor device is coupled to the second terminal of the first transistor device.

2. The reference current generating circuit as claimed in claim 1, wherein the native transistor device operates in a saturation region.

3. The reference current generating circuit as claimed in claim 1, wherein the high-voltage transistor device operates in a subthreshold region.

4. The reference current generating circuit as claimed in claim 1, wherein the reference voltage generating circuit further comprises:

a second transistor device having a first terminal, a second terminal, and a control terminal, wherein the first terminal of the second transistor device is coupled to a first voltage, and the second terminal of the second transistor device is coupled to the control terminal of the second transistor device;

a third transistor device having a first terminal, a second terminal, and a control terminal, wherein the first terminal of the third transistor device is coupled to the first voltage, and the control terminal of the third transistor device is coupled to the control terminal of the second transistor device; and a fourth transistor device having a first terminal, a second terminal, and a control terminal, wherein the first terminal of the fourth transistor device is coupled to the second terminal of the third transistor device, the second terminal of the fourth transistor device is coupled to a second voltage, and the control terminal of the fourth transistor device is coupled to the first terminal of the fourth transistor device, wherein the native transistor device has a first terminal, a second terminal, and a control terminal, the first terminal of the native transistor device is coupled to the second terminal of the second transistor device, and the second terminal and the control terminal of the native transistor device are coupled to the second voltage.

5. The reference current generating circuit as claimed in claim 1, wherein the low-voltage transistor device has a first terminal, a second terminal, and a control terminal, wherein the first terminal of the low-voltage transistor device is coupled to the second terminal of the first transistor device, and the control terminal of the low-voltage transistor device is coupled to the reference voltage generating circuit; and the high-voltage transistor device has a first terminal, a second terminal, and a control terminal, wherein the first terminal of the high-voltage transistor device is coupled to the second terminal of the low-voltage transistor device, the second terminal of the high-voltage transistor device is coupled to a second voltage, and the control terminal of the high-voltage transistor device is coupled to the reference voltage generating circuit.

6. The reference current generating circuit as claimed in claim 5, wherein the control terminal of the low-voltage transistor device and the control terminal of the high-voltage transistor device receive the first reference voltage and are controlled by the first reference voltage.

7. The reference current generating circuit as claimed in claim 5, wherein the reference current flows through the first transistor device, the low-voltage transistor device, and the high-voltage transistor device sequentially.

8. The reference current generating circuit as claimed in claim 7, wherein the first terminal of the fourth transistor device is coupled to the current source circuit, and the first reference voltage is generated at the first terminal of the fourth transistor device and is output to the current source circuit through the first terminal of the fourth transistor device.

9. The reference current generating circuit as claimed in claim 5, wherein a second reference voltage is generated at the first terminal of the high-voltage transistor device.

* * * * *